United States Patent Office 3,256,060
Patented June 14, 1966

3,256,060
TREATMENT OF NICKEL-BEARING ORES
Alfred R. Globus, Forest Hills, N.Y., assignor to United International Research, Inc., a corporation of New York
No Drawing. Filed Nov. 29, 1961, Ser. No. 155,822
8 Claims. (Cl. 23—117)

This invention relates to new and useful improvements in the treatment of nickel-bearing ores.

The invention more particularly relates to, and has as an object, the recovery of nickel from nickel oxide containing ores with an efficient utilization of carbon monoxide-hydrogen containing gas, such as water gas.

The invention has as a further object a process for the treatment of nickel and cobalt containing ores with a separation of the nickel from the cobalt.

These and still further objects will become apparent from the following description:

The ores which may be treated in accordance with the invention comprise any ore containing nickel in the form of its oxide or in a form which may be readily converted to oxide, as, for example, as a sulfide or carbonate. The process is particularly suitable for the treatment of mixed nickel-cobalt ores since it allows the separation of the nickel from the chemically similar cobalt without the difficulties previously encountered.

If the ore initially contains the nickel in a form other than the oxide, such as the sulfide or carbonate, the same must first be converted to an oxide form in the conventional and well known manner, for example, by roasting in the presence of an oxygen-containing gas, for instance by heating to a dull red heat in the presence of air.

The treatment in accordance with the invention is effected with the ore at a particle size below about 100 mesh, and preferably below about 200 mesh, U.S. Standard screen size. The ore may be converted to this particle size in the conventional manner by grinding or crushing, either before or after the roasting, if a roasting treatment is necessary to convert the nickel to oxide form. The ore containing the nickel in the form of the oxide and having this particle size is then treated in a first treatment step with a carbon monoxide and hydrogen containing gas at a temperature between about 250 and 350° C. to reduce the nickel to metallic form. The carbon monoxide-hydrogen containing gas should contain between 2 and 6 parts by volume of carbon monoxide per part by volume of hydrogen under normal pressure and temperature and preferably has the composition of the readily, commercially available and inexpensive water gas.

When effecting the reduction of the nickel oxide to the metallic nickel within this temperature range, the hydrogen will selectively act for the reduction, resulting in a tail gas which is rich in carbon monoxide, and this step allows an efficient method for the selective utilization of the hydrogen, and thus in effect the separation of the hydrogen from the carbon monoxide with a simultaneous utilization of the hydrogen. The treatment will not only reduce the nickel but will, of course, reduce the other readily reducible components and will, for example, in the treatment of most complex ores result in a finely divided mixture of nickel, cobalt, copper and possibly some iron.

The carbon monoxide-rich tail gas mixture is then treated for the separation of the carbon monoxide, as for example, by a simple chilling to remove the water with traces of carbon dioxide, or by any other known or conventional method, such as by washing with cold sulfuric acid. Due to its simplicity and economy, purification by simple chilling is preferred. After this treatment the remaining gas is essentially pure carbon monoxide.

The ore from the first treatment step is allowed to cool to a temperature between about 10–35° C. and preferably to about room temperature and contacted at this temperature with the carbon monoxide recovered from the first treatment step. This treatment with the carbon monoxide results in a selective volatilization of the nickel as nickel carbonyl and thus a separation of the nickel as vaporized carbonyl from the other components, including cobalt if the same is present. The separated nickel carbonyl is then recovered and further treated in any desired manner. Preferably in accordance with the invention the recovered nickel carbonyl is converted to nickel sulfate by treatment with concentrated sulfuric acid, which treatment simultaneously results in the liberation of hydrogen and carbon monoxide which may again be utilized in the first treatment step. The sulfuric acid should preferably be as concentrated as possible but any concentrated sulfuric acid is operable. The sulfuric acid treatment should preferably be effected at a temperature of 10–60° C. The nickel sulfate produced in the process is in anhydrous form and may be used in the conventional manner to produce nickel or its compounds. Thus, for example, the sulfate may be dissolved in water to form an electrolyte for electrolysis to metallic nickel in the conventional manner.

The process is extremely economical and simple and it is only necessary to make up for the losses of the gases, such as the hydrogen which is consumed in the reduction, and the carbon monoxide which is unavoidably lost due to oxidation, as for example by the addition of further quantities of water gas. During the process it is merely necessary to make a careful periodic analysis of the gas streams in order to ascertain that the relative hydrogen-carbon monoxide balances are being maintained and to maintain this balance by the addition or discarding of the gas streams at convenient points in the process.

The pressures at which the process is effective are not critical and the same may be effected at normal increased or even reduced pressures.

The following examples are given by way of illustration and not limitation:

*Example 1*

An ore is treated which has the following composition of metallic components:

| | Percent |
|---|---|
| NiS | 3.5 |
| CoS | 0.3 |
| FeS | 22 |
| $SiO_2$ | 27 |
| CaO | 4 |
| MgO | 7 |

The ore is ground to a particle size below 100 mesh and heated in the presence of air to a dull red heat in a roasting furnace, converting the sulfides to the oxide form. The roasted ore is then treated with water gas in a rotary kiln at a temperature of about 275° C. until the oxides are all substantially converted to metallic form. The tail gas from the kiln is recovered and cooled to about 0° C. The ore from the kiln is allowed to cool to room temperature, and at this temperature treated with carbon monoxide resulting from the purification of the tail gas by the cooling. The gas resulting from this treatment step is recovered and passed through a body of cold sulfuric acid at about 25° C., resulting in the formation of nickel sulfate and a carbon monoxide hydrogen containing gas.

*Example 2*

Example 1 is repeated, using an ore having the following metallic composition:

| | Percent |
|---|---|
| $NiCO_3$ | 2.0 |
| $CaCO_3$ | 40.0 |
| $MgCO_3$ | 28.0 |
| $SiO_2$ | 9.0 |
| $CoCO_3$ | 0.12 |

The process is effected in a continuous manner and the carbon monoxide hydrogen containing gas from the treatment with the sulfuric acid is continuously recycled to the rotary kiln.

While the invention has been described in detail with reference to certain specific embodiments, various changes and modifications which fall within the spirit of the invention will become apparent to the skilled artisan. The invention is therefore only intended to be limited by the appended claims or their equivalents wherein I have endeavored to claim all inherent novelty.

I claim:

1. Process for the recovery of nickel from nickel oxide containing ores which comprises contacting such an ore having a particle size below about 100 mesh with a carbon monoxide and hydrogen containing gas at a temperature between about 250 and 350° C. in a first treatment step, to thereby reduce the nickel to metallic form, recovering the carbon monoxide rich tail gas of said first treatment step, subjecting the same to treatment for the separation of carbon dioxide and water therefrom, contacting the ore after said first treatment step with said carbon monoxide rich gas freed of carbon dioxide and water in a second treatment step, at a temperature between 10° C. and 35° C. to thereby selectively volatilize the nickel as nickel carbonyl, thereafter reacting the nickel carbonyl so formed with concentrated sulfuric acid at 10° C.–60° C. to form nickel sulfate, carbon monoxide and hydrogen, and recycling the carbon monoxide and hydrogen to said first treatment step.

2. Process according to claim 1 in which said carbon monoxide and hydrogen containing gas is water gas.

3. Process according to claim 1 in which said ore is a nickel and cobalt containing ore and in which said treatment with carbon monoxide in said second treatment step selectively volatilizes the nickel, leaving the cobalt residue in the ore.

4. Process according to claim 1 in which said nickel sulfate is electrolyzed to metallic form.

5. Process according to claim 1 in which said first treatment step is effected at a temperature between about 250 and 350° C.

6. Process according to claim 1 in which the ore has a particle size of below about 200.

7. Process according to claim 1 which includes maintaining the ratio of hydrogen to carbon monoxide in the gas in said first treatment step between 2 and 6 parts by volume of carbon monoxide to one part by volume of hydrogen calculated under normal pressure and temperature.

8. Process according to claim 1, in which carbon monoxide rich tail gas is freed of water and carbon dioxide by chilling.

References Cited by the Examiner

UNITED STATES PATENTS

| 455,227 | 6/1891 | Mond | 23—203 |
| 1,854,234 | 4/1932 | Stanley | 23—203 |

FOREIGN PATENTS 394,906   7/1933   Great Britain.

OTHER REFERENCES

Jacobson, "Encyclopedia of Chemical Reactions," Reinhold Publishing Company, vol. 5, 1953, page 43.

Mellor, "A Comprehensive Treatise on Inorganic and Theoretical Chemistry," Longmans, Green & Company, New York, N.Y., volume 5, 1924, page 956.

BENJAMIN HENKIN, *Primary Examiner.*

MAURICE A. BRINDISI, *Examiner.*

E. C. THOMAS, *Assistant Examiner.*